US012433202B2

(12) United States Patent
Momiyama

(10) Patent No.: US 12,433,202 B2
(45) Date of Patent: Oct. 7, 2025

(54) PRUNER

(71) Applicant: YAMABIKO CORPORATION, Tokyo (JP)

(72) Inventor: Hiroshi Momiyama, Ohme (JP)

(73) Assignee: YAMABIKO CORPORATION (JP)

( * ) Notice: Subject to any disclaimer, the term of this patent is extended or adjusted under 35 U.S.C. 154(b) by 207 days.

(21) Appl. No.: 18/451,372

(22) Filed: Aug. 17, 2023

(65) Prior Publication Data

US 2024/0065176 A1 Feb. 29, 2024

(30) Foreign Application Priority Data

Aug. 31, 2022 (JP) ................................. 2022-137824

(51) Int. Cl.
*A01G 3/08* (2006.01)
(52) U.S. Cl.
CPC ............. *A01G 3/085* (2013.01); *A01G 3/081* (2013.01)
(58) Field of Classification Search
CPC ...... A01G 3/085; A01G 3/081; A01G 3/0255; A01G 3/083
USPC ......... 30/276, 372, 124, 144, 166, 296, 249, 30/246
See application file for complete search history.

(56) References Cited

U.S. PATENT DOCUMENTS

| 845,027 | A | * | 2/1907 | Bingaman | ............. A01G 3/025 30/237 |
| 2,399,393 | A | * | 4/1946 | Schillinger | ............. A01G 3/08 30/294 |
| 3,657,813 | A | * | 4/1972 | Knight | ..................... A01G 3/08 30/296.1 |
| 5,826,343 | A | * | 10/1998 | Mollberg, Jr. | ...... B27B 17/0083 83/745 |
| 6,484,409 | B2 | * | 11/2002 | Campbell | ............ B23D 49/162 30/92 |

(Continued)

FOREIGN PATENT DOCUMENTS

| CN | 107616014 | A | * | 1/2018 | ............ A01G 3/083 |
| JP | 3183504 | B2 | | 7/2001 | |

(Continued)

OTHER PUBLICATIONS

European Search Report issued in the corresponding European Patent Application No. 23191237.9; dated Feb. 5, 2024 (total 7 pages).

*Primary Examiner* — Ghassem Alie
(74) *Attorney, Agent, or Firm* — Harness, Dickey & Pierce, P.L.C.

(57) ABSTRACT

A pruner is provided including a pruning mechanism including a pruning blade on a tip side, a pole connected to a base side of the pruning mechanism, and a hook mechanism including a hook that projects to a lateral side substantially orthogonal to a central axis of the pole and that is displaceable in a range from a first position where an end portion is away from the central axis to a second position where the end portion is close to the central axis. The hook is configured to keep the first position when first external force in a direction from the base side toward the tip side is applied, and be displaced from the first position to the second position when second external force in a direction from the tip side toward the base side and/or a direction from the lateral side toward the central axis is applied.

12 Claims, 6 Drawing Sheets

(56) References Cited

U.S. PATENT DOCUMENTS

| | | | | |
|---|---|---|---|---|
| 7,913,403 B1* | 3/2011 | Willetts | ................... | A01G 3/08 |
| | | | | 30/296.1 |
| 11,618,149 B2* | 4/2023 | Banholzer | ........... | B27B 17/0008 |
| | | | | 173/217 |
| 2002/0162227 A1* | 11/2002 | Cech | ........................ | A01G 3/08 |
| | | | | 30/296.1 |
| 2019/0357446 A1 | 11/2019 | McCue et al. | | |
| 2023/0320278 A1* | 10/2023 | Miyawaki | .............. | A01G 3/083 |
| | | | | 30/162 |

FOREIGN PATENT DOCUMENTS

| | | | | | |
|---|---|---|---|---|---|
| JP | | 6920774 B1 * | 8/2021 | ............. | A01G 3/083 |
| WO | WO-2018046141 A1 * | | 3/2018 | ........... | A01G 3/0255 |

* cited by examiner

PRUNER

CROSS REFERENCE TO RELATED APPLICATIONS

The present application claims priority under 35 U.S.C. § 119 to Japanese Patent Application No. 2022-137824, filed on Aug. 31, 2022, the entire contents of which are incorporated by reference.

BACKGROUND

Technical Field

The present disclosure relates to a pruner.

Related Art

Conventionally, there has been a pruning tool used for grass cutting, branch/leaf trimming, tree pruning, etc. (see PCT International Application, Publication No. (WO2018/046141). This pruning tool includes a tool portion and a pole connected to the tool portion.

The pruning tool further includes a hook assembly disposed on the tool portion or the pole. The hook assembly can be used to pull down pruned branches caught in trees.

However, according to the inventor's study, when the size of the hook assembly is large, the pruned branches are easily pulled down, but the hook assembly may hinder the pruning tool from reaching pruning target brunches. On the other hand, when the size of the hook assembly is small, the hook assembly is less likely to hinder the pruning tool from reaching pruning target brunches, but it becomes difficult to pull down pruned branches.

In addition, in a case where the size of the hook assembly is large, when the pruning tool is put on the ground or on a mount stand, the pruning tool may lose balance and fall.

WO2018/046141 also discloses an example of a hook assembly configured to be manually rotatable, but in order that the hook assembly is rotated, pruning, etc. needs to be temporarily stopped.

In view of the above circumstances, the present disclosure provides a pruner with easy operability in branch trimming and in pruning, the pruner being less likely to fall when put on the ground or on a mount stand.

According to an aspect of the present disclosure, a pruner is provided. This pruner includes a pruning mechanism including a pruning blade on a tip side, a pole connected to a base side of the pruning mechanism, and a hook mechanism including a hook that projects to a lateral side substantially orthogonal to a central axis of the pole and that is displaceable in a range from a first position where an end portion is away from the central axis to a second position where the end portion is close to the central axis. The hook is configured to keep the first position when first external force in a direction from the base side toward the tip side is applied, and be displaced from the first position to the second position when second external force in a direction from the tip side toward the base side and/or a direction from the lateral side toward the central axis is applied.

According to such an aspect, it is possible to provide a pruner with easy operability in branch trimming and in pruning, the pruner being less likely to fall when put on the ground or on a mount stand.

DETAILED DESCRIPTION

Hereinafter, a description will be given of embodiments of the present disclosure with reference to drawings. Various features described in the following embodiments can be combined with each other.

A program for realizing a software described in the present embodiment may be provided as a computer-readable non-transitory memory medium, may be provided to be downloaded via an external server, or may be provided so that the program is activated on an external computer and the program's function is realized on a client terminal (that is, the function is provided by so-called cloud computing).

A term "unit" in the present embodiment may include, for example, a combination of a hardware resource implemented as circuits in a broad sense and information processing of software that can be concretely realized by the hardware resource. Furthermore, various types of information are described in the present embodiment, and such information may be represented by, for example, physical values of signal values representing voltage and current, high and low signal values as a set of binary bits consisting of 0 or 1, or quantum superposition (so-called qubits), and communication and computation may be executed on a circuit in a broad sense.

The circuit in a broad sense is a circuit realized by properly combining at least a circuit, circuitry, a processor, a memory, and the like. In other words, a circuit includes an application specific integrated circuit (ASIC), a programmable logic device (e.g., simple programmable logic device (SPLD), a complex programmable logic device (CLPD), field programmable gate array (FPGA), and the like.

Figure 1:
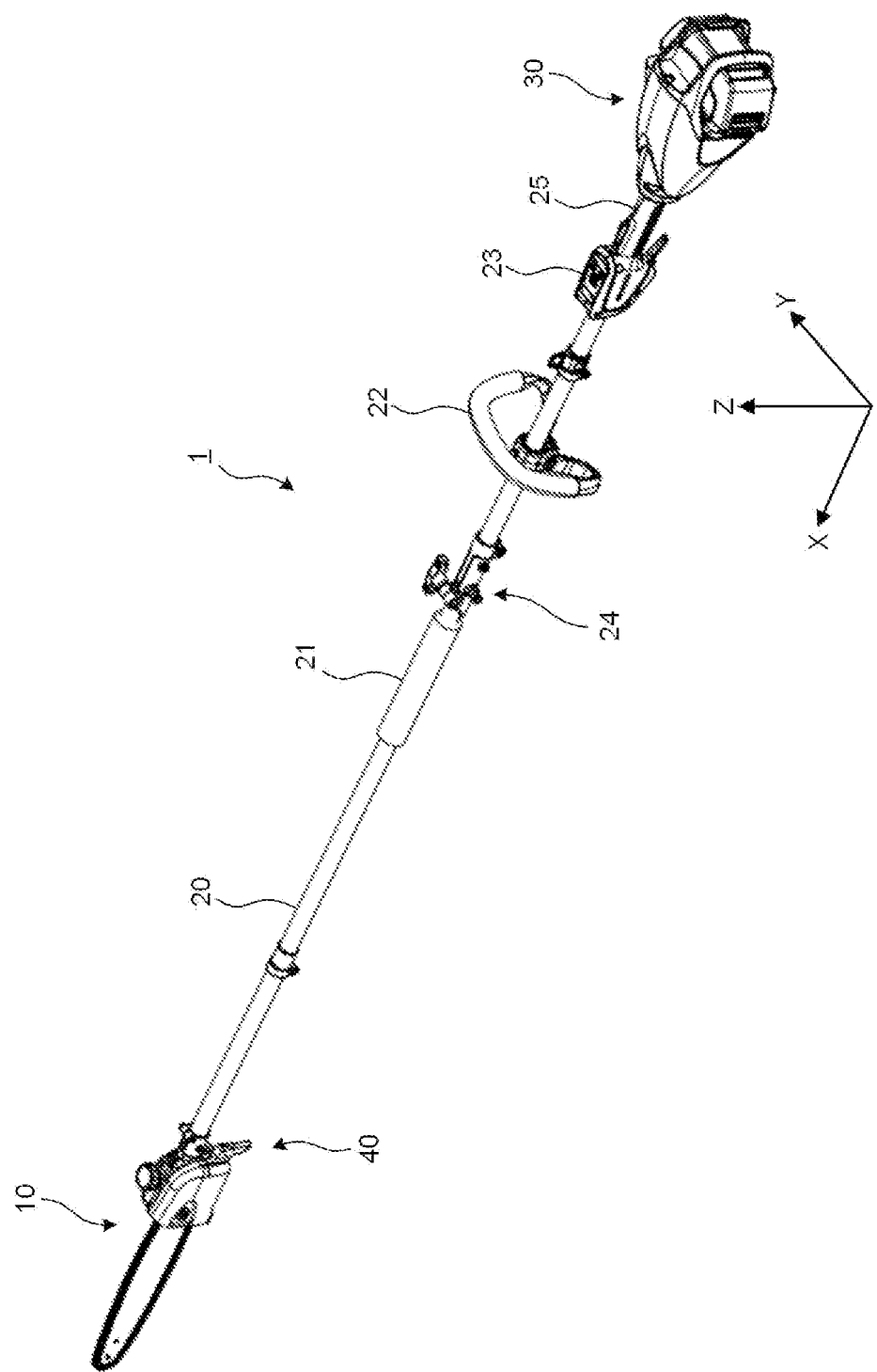
FIG. 1 is a perspective view of a pruner according to an embodiment of the present disclosure.
Figure 2:
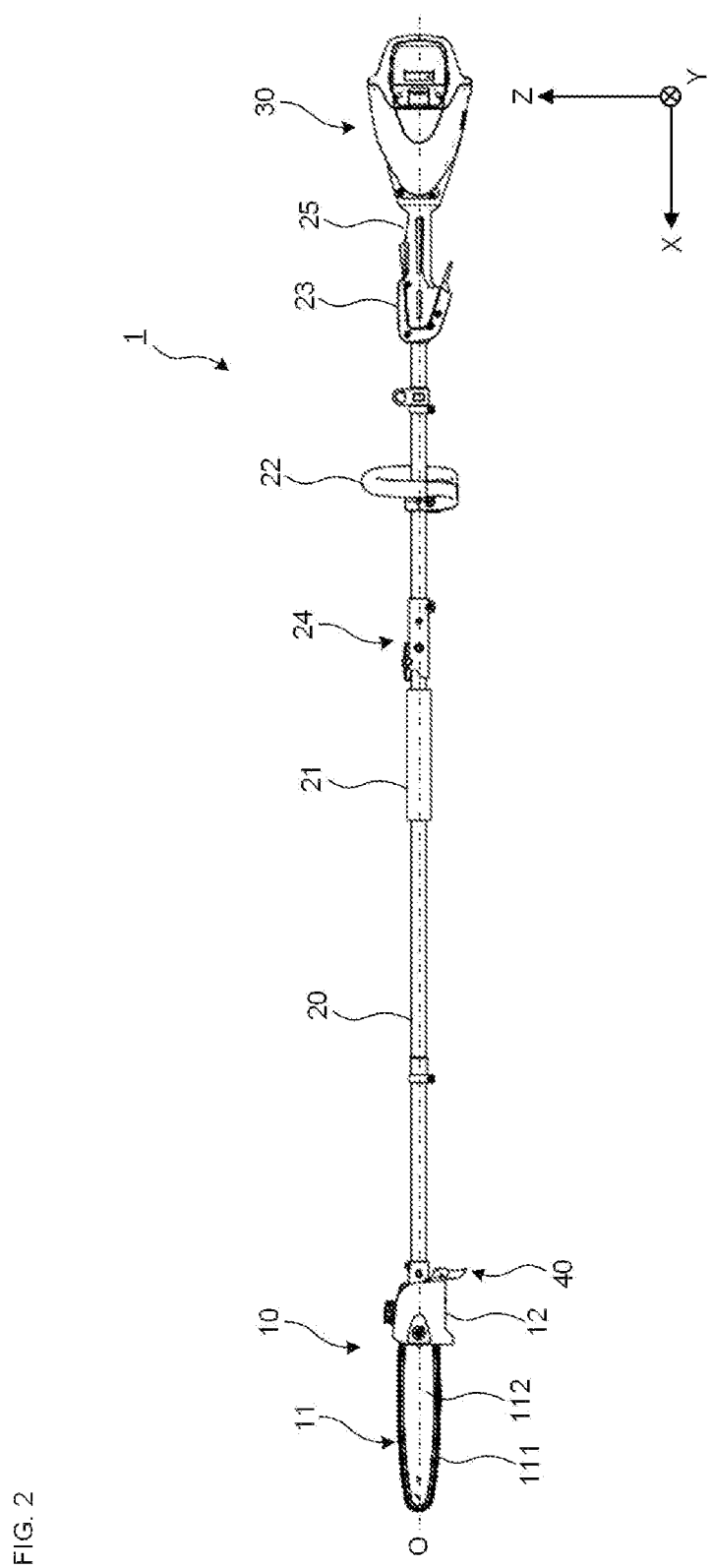
FIG. 2 is a plan view of the pruner illustrated in FIG. 1.
Figure 3:
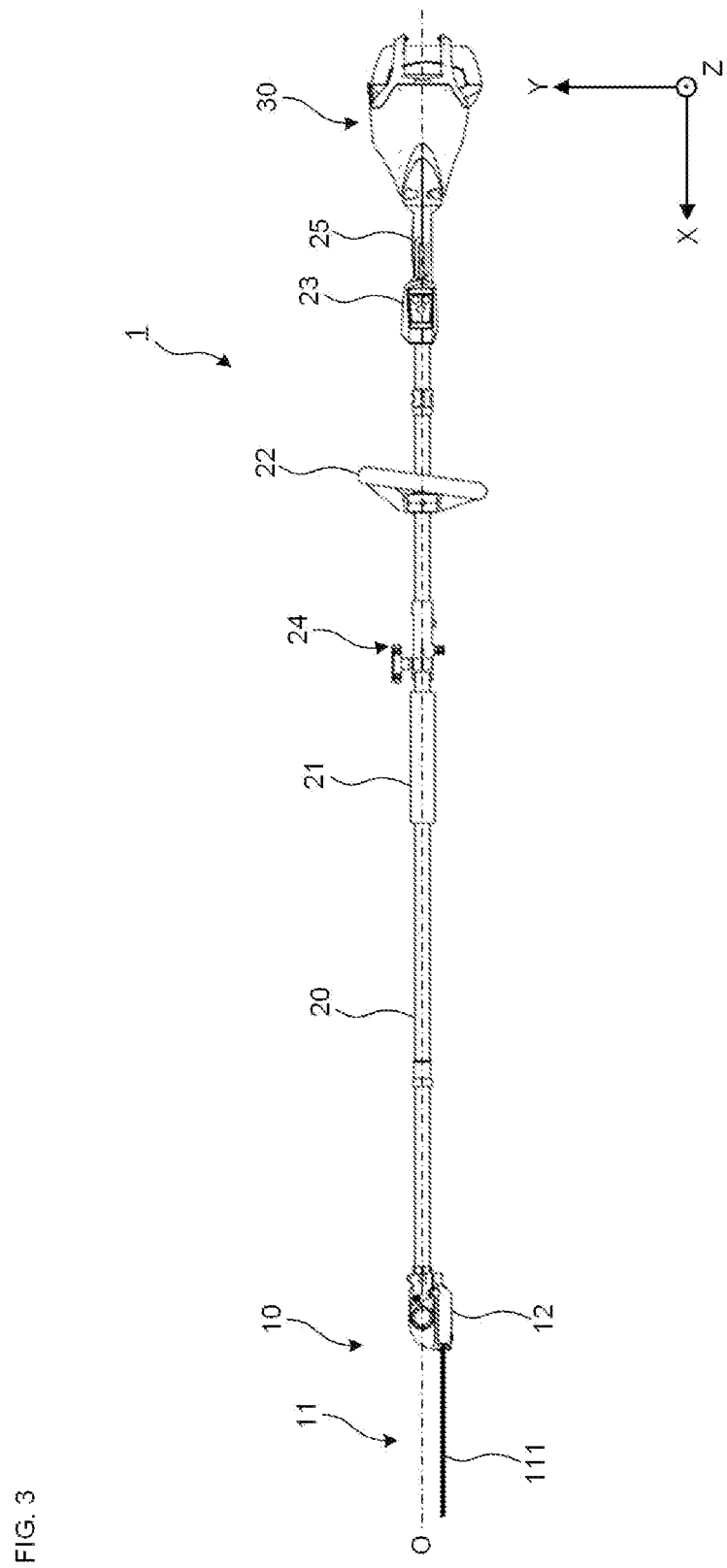
FIG. 3 is a side view of the pruner illustrated in FIG. 1.
Figure 4:
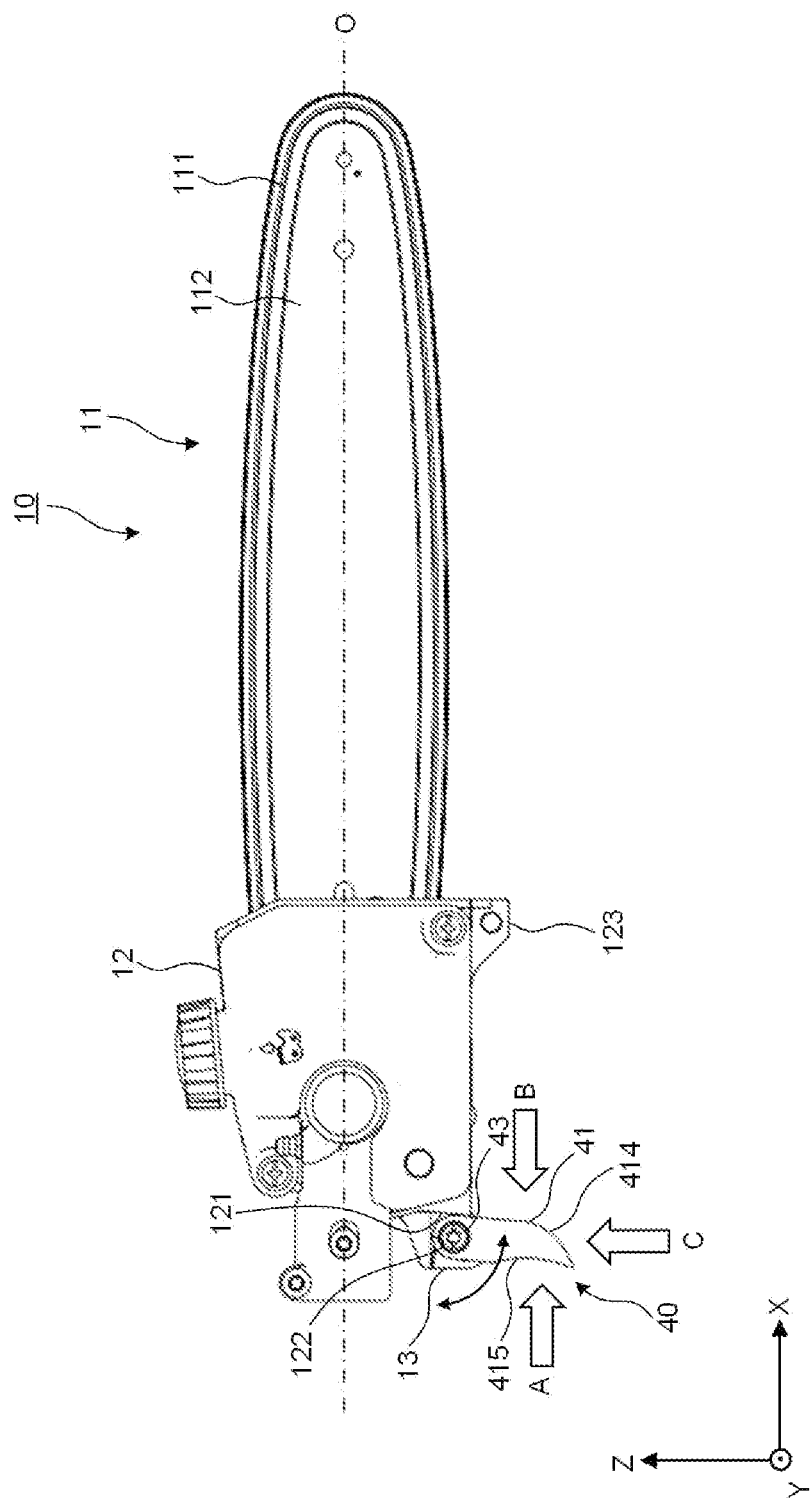
FIG. 4 is a plan view of a pruning mechanism.
Figure 5:
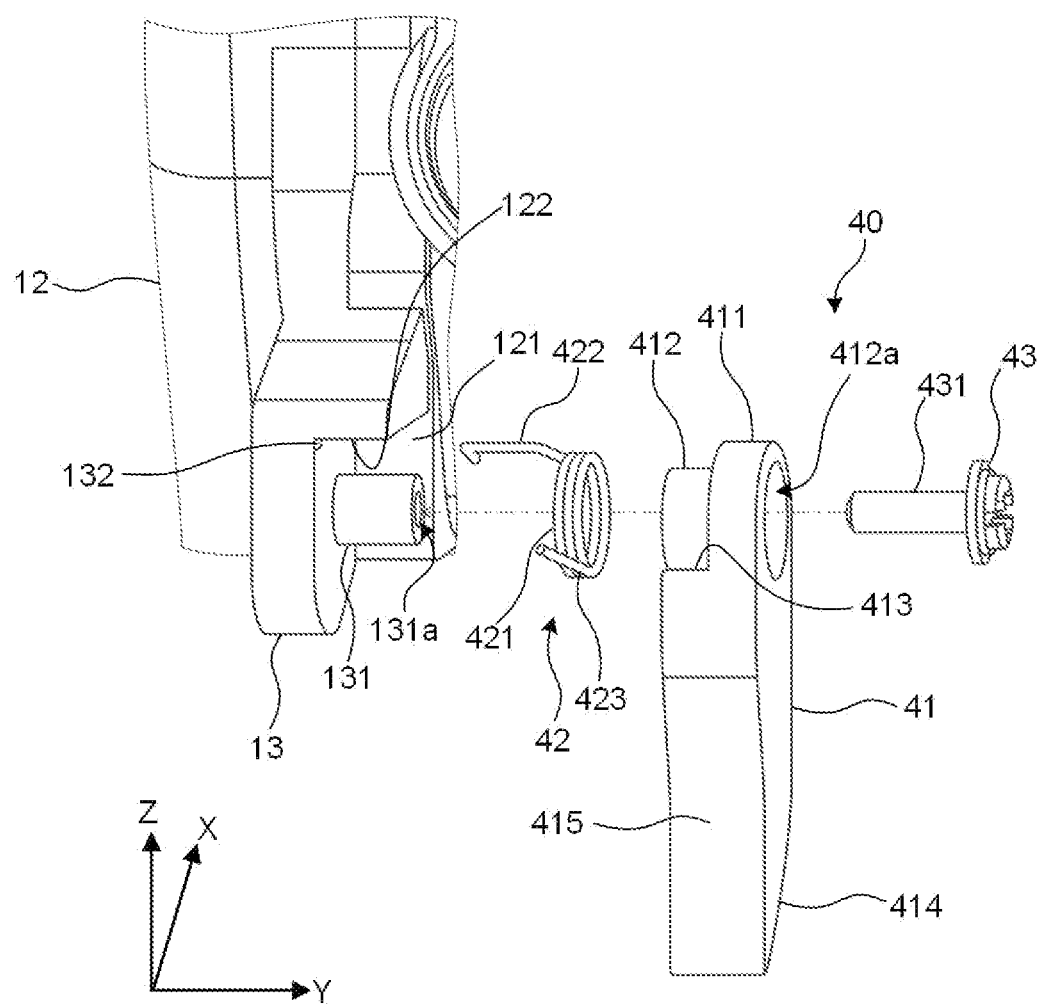
FIG. 5 is an exploded perspective view illustrating the configuration of the hook mechanism.

FIG. 1 is a perspective view of a pruner according to an embodiment of the present disclosure. FIG. 2 is a plan view of the pruner illustrated in FIG. 1. FIG. 3 is a side view of the pruner illustrated in FIG. 1. FIG. 4 is a plan view of a pruning mechanism. FIG. 5 is an exploded perspective view illustrating a configuration of the hook mechanism.

In the following description, directions are identified according to an X-axis, a Y-axis, and a Z-axis set as illustrated in each drawing. Thus, a positive side in the X-axis direction corresponds to a "tip side" and a negative side in the X-axis direction corresponds to a "base side".

As illustrated in FIG. 1 through FIG. 3, the pruner 1 according to an embodiment of the present disclosure includes a pruning mechanism 10, a pole (operation rod) 20 connected to a negative side in the X-axis direction (base side) of the pruning mechanism 10, and a driving mechanism 30 connected to a negative side in the X-axis direction (hand side) of the pole 20.

The pruning mechanism 10 includes a pruning blade 111 on its positive side in the X-axis direction (tip side). In the present embodiment, a pruning unit 11 of the pruning mechanism 10 is a chainsaw including a pruning blade 111 configured to move continuously.

In this pruning mechanism 10, a chain engaged with a sprocket in a gearbox 12 slides along perimeter of a guide plate 112, and thereby the pruning blade 111 attached to the chain moves continuously. In other words, the pruning blade 111 is configured to rotate along an elliptical trajectory having a major axis parallel to the central axis O of the pole 20.

The pruning unit 11 may be, for example, a saw having a pruning blade reciprocally movable along the central axis O, shears having pruning blades openable and closable across the central axis O, a disk having a pruning blade rotatable about a rotation axis parallel or inclined to the central axis O, or the like.

The driving mechanism 30 includes a prime mover configured to drive the pruning mechanism 10. The prime mover may be an engine or an electric motor.

When the prime mover is an engine, the driving mechanism 30 includes a fuel tank configured to store fuel for engine's operation. Alternatively, when the prime mover is an electric motor, the driving mechanism 30 includes a battery configured to supply electricity to the electric motor.

The driving mechanism 30 may be separated from the pole 20 and be configured to be worn on a body by a user carrying the driving mechanism 30 on the user's back or wrapping the driving mechanism 30 around the user's waist.

Power generated by the driving mechanism 30 is transmitted to the gearbox 12 of the pruning mechanism 10 disposed on the positive side in the X-axis direction of the pole 20 via a flexible transmission shaft (not illustrated) disposed inside the pole 20.

Along the central axis O, the pole 20 includes a first grip 21, a handle 22, an operation unit 23, and a second grip 25, in order from the positive side to the negative side in the X-axis direction.

The grip 21 covers an outer circumference of the pole 20. The handle 22 is made of a curved pipe-like member having an annular shape and is substantially orthogonal to the central axis O. When pruning is operated with the second grip 25 gripped and the first grip 21 or the handle 22 gripped, the operability and safety of the pruning can be improved.

The operation unit 23 includes operation buttons, etc. for turning on/off the driving mechanism 30 and shifting speeds. When the second grip 25 is gripped, the operation unit 23 can be easily and safely operated.

According to such a pruner 1, the user can perform tree trimming, pruning, etc. with the pruning mechanism 10 facing an upper side or a lateral side in a state where the user grips the second grip 25 with one hand on either side and the first grip 21 or the handle 22 (preferably the handle 22) with the other hand.

Between the grip 21 and the handle 22, there is a fixing mechanism 24 for replacing the pole 20 and fixing a newly attached pole 20 connected to a pruning mechanism 10 (pruning unit 11) of different type. When the pole 20 includes an extendable/retractable mechanism, the pole 20 can be configured to be extended or retracted by operating the fixing mechanism 24.

The pruner 1 further includes a hook mechanism 40. In this embodiment, the hook mechanism 40 is disposed on the negative side in the X-axis direction (base side) of the gearbox 12 of the pruning mechanism 10.

As illustrated in FIG. 5, at a lower part on the negative side in the X-axis direction of the gearbox 12, there is a flat-plate like mount unit 13 projecting to the negative side in the Z-axis direction.

This mount unit 13 includes a cylindrical shaft portion 131 projecting to the positive side in the Y-axis direction. The shaft portion 131 has a thread groove 131a formed on its inner circumference.

The mount unit 13 has a through hole 132 penetrating it in the Y-axis direction.

Two surfaces facing the shaft portion 131 of the gearbox 12 are contact surfaces 121 and 122 configured to contact a hook 41 described below. The contact surface 121 is substantially orthogonal to the X-axis, and the contact surface 122 is substantially orthogonal to the Z-axis. Therefore, the contact surface 121 and the contact surface 122 are substantially orthogonal to each other.

The hook mechanism 40 is attached to the mount unit 13. The hook mechanism 40 includes the hook 41, a torsion spring (a biasing member) 42, and a screw 43.

The hook 41 is a narrow plate-like member and includes a thin portion 411 with a thin thickness at an end portion on the positive side in the Z-axis direction of the hook 41.

The thin portion 411 is provided with a cylindrical holder 412 projecting to the negative side in the Y-axis direction and configured to hold the torsion spring 42. The holder 412 and the thin portion 411 have a through hole 412a continuously formed through them. The shaft portion 131 is inserted into the through hole 412a.

Size of the hook 41 in its longitudinal direction increases from the positive side toward the negative side in the X-axis direction (from the tip side to the base side), as illustrated in FIG. 4. In this embodiment, an end portion of the hook 41 has a curved convex end surface 414. The hook 41 has a curved concave side surface 415 on its negative side in the X-axis direction.

The torsion spring 42 includes a spring body 421 made of a wire material wound in a cylindrical shape, an end portion 422 continuously connected to the spring body 421 and extending toward the negative side in the Y-axis direction, and an end portion 423 continuously connected to the spring body 421 and extending toward the negative side in the X-axis direction. The end portion 422 is bent toward the positive side in the X-axis direction in the middle of the extension in the Y-axis direction.

The spring body 421 of the torsion spring 42 is disposed around the outer circumference of the holder 412 of the hook 41. In this state, the end portion 422 is inserted into the through hole 132, the bent portion of the end portion 422 is hooked to the circumference on the negative side in the Y-axis direction of the through hole 132, and the shaft portion 131 is inserted into the through hole 412a of the holder 412. At this time, the end portion 423 of the torsion spring 42 contacts a step portion 413 of the hook 41. Thereafter, the screw 43 is inserted into the through hole 412a, and the thread of the thread portion 431 is allowed to mesh with the thread groove 131a of the shaft portion 131.

Thereby, the hook 41 (hook mechanism 40) is attached to the mount unit 13 of the gearbox 12.

In the hook mechanism 40 having such a configuration, the hook 41 projects to the negative side in the Z-axis direction (a lateral side substantially orthogonal to the central axis O of the pole 20) and is rotatable (displaceable) in a range from a first position where the end portion is away from the central axis O to a second position where the end portion is close to the central axis O.

An end portion of the hook 41 on a side where the hook 41 is rotatably attached to the mount unit 13 is also referred to as "attached end portion" and an end portion of the hook 41 opposite to the mount unit 13 is also referred to as "free end portion".

At the first position (position illustrated in FIG. 4), the hook 41 contacts the contact surface (first contact portion) 121 of the gearbox 12, and at the second position (position where the hook 41 is substantially parallel to the central axis O), the hook 41 contacts the contact surface (second contact portion) 122 of the gearbox 12. Thus, the free end portion of the hook 41 is rotatable in a range from a position where the free end portion faces the negative side of the Z-axis to a position where the end portion faces the negative side of the X-axis (substantially 90°).

As illustrated in FIG. 4, the hook 41 is configured to keep the first position by contacting the contact surface 121 of the gearbox 12 when first external force in a direction A from the negative side toward the positive side in the X-axis direction (from the base side to the tip side) is applied. In other words, at the first position, the contact surface 121 stops the rotation of the hook 41.

On the other hand, the hook 41 is configured to rotate (be displaced) from the first position to the second position when second external force in a direction B from the positive side toward the negative side in the X-axis direction (from the tip side to the base side) and/or a direction C from the negative side toward the positive side in the Z-axis direction (from the lateral side to the central axis O) is applied. At the second position, the hook 41 contacts the contact surface 122 of the gearbox 12, and thereby further rotation of the free end portion toward the positive side in the Z-axis direction is stopped (restricted).

When the hook 41 is at the second position, the torsion spring 42 is in a compressed state in which the torsion spring 42 is compressed against its force. In this state, the torsion spring 42 biases the hook 41 from the second position toward the first position. Therefore, when the second external force in the direction B and/or the direction C is removed, the hook 41 can be rotated (displaced) from the second position to the first position by the biasing force of the torsion spring 42.

In a case where the prime mover is an electric motor, the pruner 1 includes a built-in control board (not illustrated) configured to control the operation of the electric motor. This control board includes an operation element and a storage element.

The operation element includes, for example, a CPU (Central Processing Unit), an MPU (Micro Processing Unit), or the like. The operation element realizes various functions pertaining to the pruner 1 by reading a predetermined program stored in the storage element. That is, the operation element concretely realizes information processing by software stored in the storage element.

The operation element is not limited to a single element and may include two or more operation elements for each function or may include a combination thereof.

The storage element stores various information as defined by the above description. The storage element can be implemented, for example, as a storage device such as a solid state drive (SSD) configured to store various programs, etc. pertaining to the pruner 1 executed by the operation element or as a memory such as a random access memory (RAM) configured to temporarily store necessary information (arguments, sequences, etc.) pertaining to the program operations.

The storage element stores various programs, variables, etc. pertaining to the pruner 1 executed by the operation element.

Next, the use (action) of the pruner 1 will be described.

For example, in branch/leaf trimming or tree pruning, the pruning unit 11 of the pruning mechanism 10 passes between branches and thereby reaches a pruning target brunch.

The hook 41 at the first position contacts surrounding branches and thus the second external force in the direction B is applied. As a result, since the hook 41 rotates toward the second position, the hook 41 avoids being caught by the contacted branches, which allows the pruning mechanism 10 to reach the pruning target brunch.

In particular, since the hook 41 includes the curved convex end surface 414 at its free end portion, the hook 41 smoothly moves (slides) in response to the contact with the branches, which increases the likelihood that the hook 41 avoids being caught by the contacted branches.

A pruned branch may not be able to fall on the ground as being caught by surrounding branches. In this case, the pruned branch is hooked with the hook 41 so that the pruned branch is pulled off. At this time, the pruned branch is hooked and pulled by the negative side in the X-axis direction of the hook 41 at the first position. As a result, a first external force in the direction A is applied to the hook 41, but since the hook 41 is in contact with the contact surface 121 of the gearbox 12, the rotation of the hook 41 is restricted. Thus, the pruned branch can be pulled off successfully.

In particular, since the hook 41 has a curved concave side surface 415 on its negative side in the X-axis direction, it is possible to more certainly hook the pruned branch. From the viewpoint of maintaining this hooking state well, the side surface 415 may have a non-slip structure by forming a plurality of grooves or a plurality of protrusions, by adhering a flexible material, or the like.

Furthermore, after the trimming or pruning is completed, the pruner 1 is put on the ground or a mount stand. At this time, the second external force in the direction C is applied to the hook 41, and the hook 41 rotates from the first position toward the second position. As a result, it is possible to hinder the pruner 1 from falling due to the hook 41 getting in the way of putting the pruner 1.

When the hook 41 reaches the second position, the hook 41 is in contact with the contact surface 122 of the gearbox 12, and thus its rotation is restricted. The gearbox 12 has a leg portion 123 projecting to the negative side in the Z-axis direction, as illustrated in FIG. 4. Therefore, when the pruner 1 is put on the ground, a mount stand, or the like, the hook 41 at the second position and the leg portion 123 can be allowed to function as a support mechanism configured to stably support the pruner 1.

The hook mechanism 40 may be configured as described below.

Figure 6:
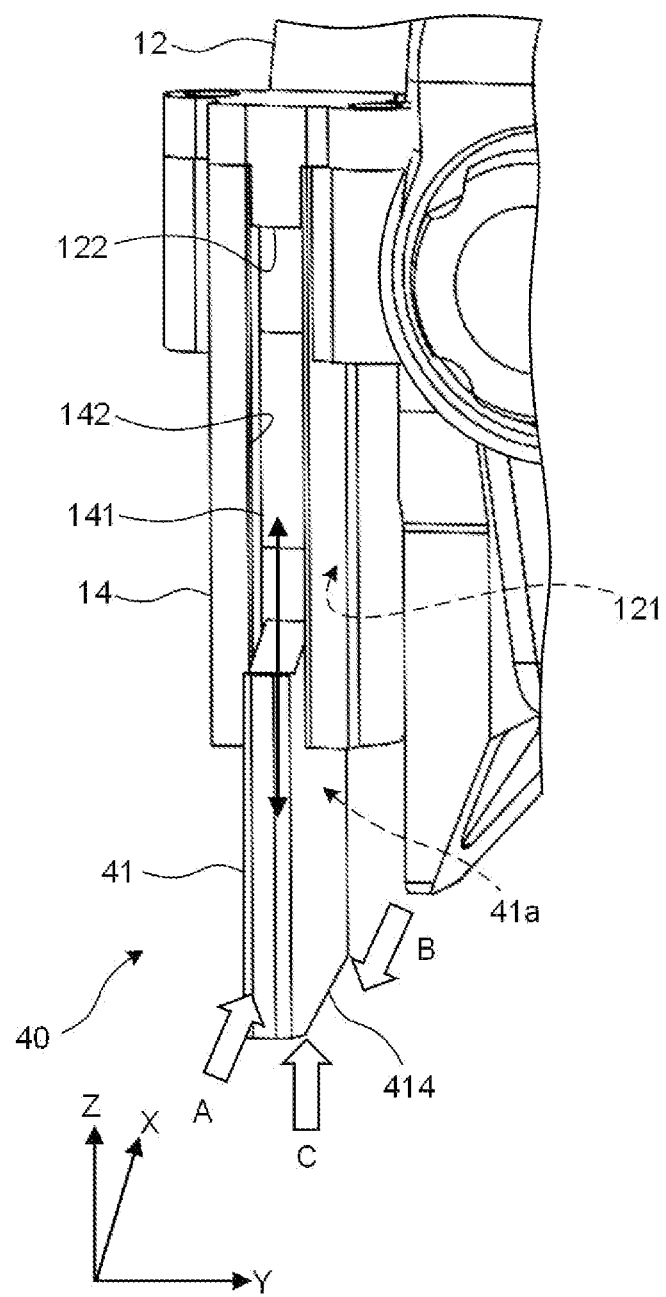
FIG. 6 is a diagram illustrating a hook mechanism having different configuration.

FIG. 6 is a perspective view illustrating another configuration of the hook mechanism.

In the configuration illustrated in FIG. 6, a guide 14 is provided at the lower part on the negative side in the X-axis direction (base side) of the gearbox 12. This guide 14 includes a guide rod 141 and a guide groove 142 extending along the Z-axis direction.

The hook 41 is made of a flat plate material and has a hole 41a into which the guide rod 141 is inserted in the Z-axis direction. The hook 41 is inserted into the guide groove 142 while a thickness direction of the hook 41 matches a width direction of the guide groove 142.

In the configuration example illustrated in FIG. 6, the free end portion of the hook 41 has a straight end surface 414.

Although not illustrated in the drawing, there is a blocking structure configured to prevent the hook 41 from being detached from the guide 14 at the first position illustrated in FIG. 6.

At a predetermined point between the hook 41 and the guide 14, there is a biasing member (e.g., a coil spring, etc.) configured to bias the hook 41 from the positive side toward the negative side in the Z-axis direction.

In the hook mechanism 40 having such a configuration, the hook 41 projects to the negative side in the Z-axis direction (a lateral side substantially orthogonal to the central axis O of the pole 20) and is slidable (displaceable) in a range from a first position where the end portion is away from the central axis O to a second position where the end portion is close to the central axis O, the second position being located on the positive side in the Z-axis direction of the first position. In other words, the hook 41 is slidable in the Z-axis direction (a direction substantially orthogonal to the central axis O).

The hook 41 is configured to keep the first position by contacting the contact surface (a first contact portion that is a bottom surface of the guide groove 142) 121 of the gearbox 12 when the first external force in the direction A from the negative side toward the positive side in the X-axis direction (base side to tip side) is applied.

On the other hand, the hook 41 (end surface 414) is configured to slide (be displaced) from the first position to the second position when the second external force in the direction B from the positive side toward the negative side in the X-axis direction (from the tip side toward the base side) and/or in the direction C from the negative side toward the positive side in the Z-axis direction (from the lateral side toward the central axis O) is applied. At the second position, the hook 41 contacts the contact surface (second contact portion) 122 of the gearbox 12, thereby restricting further sliding of the free end portion toward the positive side in the Z-axis direction.

When the hook 41 is at the second position, the biasing member is compressed against its force and is in a compressed state. In this state, the biasing member biases the hook 41 from the second position toward the first position. Thus, when the second external force in the direction B and/or the direction C is removed, the biasing force of the biasing member can allow the hook 41 to slide (to be displaced) from the second position to the first position.

The end surface 414 of the hook 41 may have a curved concave shape. In this case, when the pruning unit 11 of the pruning mechanism 10 passes between branches, the end surface 414 can be likely to be caught. This makes it easier to convert the second external force in the direction B into the second external force in the direction C, which allows the hook 41 to slide more certainly to the positive side in the Z-axis direction.

In the pruner 1 described above, since the hook 41 is configured to be displaced to the first position and to second position by external force, it is possible to provide good operability during branch trimming or pruning and to hinder the pruner from falling when the pruner is put on the ground, a mount stand, or the like.

In the above embodiment, the hook mechanism 40 is disposed at the lower part on the negative side in the X-axis direction of the gearbox 12, but its location is not limited to this. The hook mechanism 40 may be disposed at or near the connection between the pruning mechanism 10 and the pole 20, and for example, may be disposed at an end portion on the positive side in the X-axis direction of the pole 20, at the connection between the pruning mechanism 10 and the pole 20, or at the lower part (near the leg 123) on the positive side in the X-axis direction of the gearbox 12.

Furthermore, each of the following aspects may be provided.

(1) A pruner characterized by comprising: a pruning mechanism including a pruning blade on a tip side; a pole connected to a base side of the pruning mechanism; and a hook mechanism including a hook that projects to a lateral side substantially orthogonal to a central axis of the pole and that is displaceable in a range from a first position where an end portion is away from the central axis to a second position where the end portion is close to the central axis, wherein the hook is configured to: keep the first position when first external force in a direction from the base side toward the tip side is applied, and be displaced from the first position to the second position when second external force in a direction from the tip side toward the base side and/or a direction from the lateral side toward the central axis is applied.

(2) The pruner according to (1), wherein the hook is configured to rotate in a range from the first position to the second position.

(3) The pruner according to (2), further comprising a first contact portion configured to contact the hook at the first position and thereby to stop rotation of the hook.

(4) The pruner according to (2) or (3), further comprising a second contact portion configured to contact the hook at the second position and thereby to stop rotation of the hook.

(5) The pruner according to (1), wherein in a range from the first position to the second position, the hook is configured to slide along a direction substantially orthogonal to the central axis.

(6) The pruner according to any one of (1) to (5), wherein the hook mechanism further includes a biasing member configured to bias the hook from the second position toward the first position.

(7) The pruner according to any one of (1) to (6), wherein size of the hook in a longitudinal direction increases from the tip side toward the base side.

(8) The pruner according to any one of (1) to (7), wherein the end portion of the hook includes a straight or curved convex end surface.

(9) The pruner according to any one of (1) to (8), wherein the hook mechanism is disposed at or near a connection between the pruning mechanism and the pole.

(10) The pruner according to any one of (1) to (9), wherein the pruning blade is configured to rotate along an elliptical trajectory having a major axis parallel to the central axis.

Of course, the present disclosure is not limited to these.

As described above, various embodiments of the present disclosure have been described, but these are presented as examples and are not intended at all to limit the scope of the disclosure. Novel embodiments can be implemented in various other forms, and various omissions, replacements, and modifications can be made within the scope of the spirit of the disclosure. The embodiments and its modifications are included in the scope and the spirit of the disclosure and are included in the scope of the disclosure described in claims and the equivalent scope thereof.

What is claimed is:

1. A pruner comprising:
a pruning mechanism including a pruning blade on a tip side and a gearbox mechanically connected to the pruning blade;
a pole connected to a base side of the pruning mechanism;
a hook mechanism including a hook that projects to a lateral side substantially orthogonal to a central axis of the pole and that is displaceable in a range from a first position where an end portion is away from the central axis to a second position where the end portion is close to the central axis; and
a leg portion projecting to the lateral side of the pole, wherein the hook is configured to:
keep the first position when first external force in a direction from the base side toward the tip side is applied, be displaced from the first position to the second position when second external force in a direction from the tip side toward the base side and/or a direction from the lateral side toward the central axis is applied, the hook at the second position and the leg portion are configured to support the pruner when the pruner is placed on a ground or a mount stand, and the leg portion projects from a first part of the gearbox, and the hook projects from a second part, which is different from the first part, of the gearbox.

2. The pruner according to claim 1, wherein the hook is configured to rotate in a range from the first position to the second position.

3. The pruner according to claim 2, further comprising a first contact portion configured to contact the hook at the first position and thereby to stop rotation of the hook.

4. The pruner according to claim 2, further comprising a second contact portion configured to contact the hook at the second position and thereby to stop rotation of the hook.

5. The pruner according to claim 1, wherein in a range from the first position to the second position, the hook is configured to slide along a direction substantially orthogonal to the central axis.

6. The pruner according to claim 1, wherein the hook mechanism further includes a biasing member configured to bias the hook from the second position toward the first position.

7. The pruner according to claim 1, wherein size of the hook in a longitudinal direction increases from the tip side toward the base side.

8. The pruner according to claim 1, wherein the end portion of the hook includes a straight or curved convex end surface.

9. The pruner according to claim 1, wherein the hook mechanism is disposed at or near a connection between the pruning mechanism and the pole.

10. The pruner according to claim 1, wherein the pruning blade is configured to rotate along an elliptical trajectory having a major axis parallel to the central axis.

11. The pruner according to claim 1, wherein the hook is provided at an opposite side of the pruning blade with respect to the leg portion..

12. The pruner according to claim 1, wherein the gearbox has a front side and a rear side opposite to each other along the central axis of the pole, and the front side is located closer to the tip side of the pruning blade than the rear side, and the leg portion projects from the first part in the front side of the gearbox, and the hook projects from the second part in the rear side of the gearbox.

* * * * *